(12) United States Patent
Muko et al.

(10) Patent No.: US 8,241,456 B2
(45) Date of Patent: Aug. 14, 2012

(54) METHOD FOR PRODUCING ELECTRIC-WAVE-TRANSMISSIBLE TRANSFERRING MEMBER

(75) Inventors: Hiromitsu Muko, Kyoto (JP); Susumu Innan, Kyoto (JP); Akihiro Maeda, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 12/602,261

(22) PCT Filed: May 23, 2008

(86) PCT No.: PCT/JP2008/059549
§ 371 (c)(1),
(2), (4) Date: Nov. 30, 2009

(87) PCT Pub. No.: WO2008/149694
PCT Pub. Date: Dec. 11, 2008

(65) Prior Publication Data
US 2010/0175823 A1 Jul. 15, 2010

(30) Foreign Application Priority Data
May 31, 2007 (JP) .................................. 2007-144879

(51) Int. Cl.
*B32B 38/10* (2006.01)
(52) U.S. Cl. ........ 156/247; 156/155; 156/277; 156/278; 156/281; 156/289; 156/344
(58) Field of Classification Search ................... 156/155, 156/247, 277, 278, 281, 289, 344
See application file for complete search history.

(56) References Cited

U.S. PATENT DOCUMENTS
4,714,631 A * 12/1987 Aufderheide ................. 427/250
(Continued)

FOREIGN PATENT DOCUMENTS
JP 01-103500 4/1989
(Continued)

OTHER PUBLICATIONS
Patent Cooperation Treaty (PCT) International Preliminary Report on Patentability issued Jan. 12, 2010 in corresponding to International Application No. PCT/JP2008/059549.
(Continued)

*Primary Examiner* — Khanh P Nguyen
*Assistant Examiner* — Margaret Squalls
(74) *Attorney, Agent, or Firm* — Wenderoth, Lind & Ponack, LLP

(57) ABSTRACT

A method for producing an electric-wave-transmissible transferring member capable of expressing a metallic luster pattern having a sharp outline. A peel layer (3) is formed on a base sheet (2) throughout the entire surface of the sheet. Next, a water-soluble pattern layer (4) is partially formed thereon. Next, an electric-wave-transmissible metallic luster layer (5) is formed thereon and throughout the entire surface thereof. Next, a protective layer (6) is formed thereon and throughout the entire surface thereof, or is formed thereon and, partially, in the region where the water-soluble pattern layer (4) is not formed. Next, the workpiece is subjected to a heating treatment and then a water-washing treatment to peel and remove the water-soluble pattern layer (4), and the electric-wave-transmissible metallic luster layer (5) and the protective layer (6) formed over the layer (4). Next, an adhesive layer (7) is wholly or partially formed on the workpiece.

4 Claims, 2 Drawing Sheets

U.S. PATENT DOCUMENTS

| | | | |
|---|---|---|---|
| 4,891,254 A | * | 1/1990 | Bianco .............................. 428/68 |
| 2007/0160762 A1 | * | 7/2007 | Chaug et al. ................... 427/256 |
| 2011/0168668 A1 | * | 7/2011 | Innan .............................. 216/32 |

FOREIGN PATENT DOCUMENTS

| | | |
|---|---|---|
| JP | 03-026540 | 2/1991 |
| JP | 03-027999 | 2/1991 |
| JP | 7-37111 | 4/1995 |
| JP | 2006-123296 | 5/2006 |
| WO | 2005/028176 | 3/2005 |

OTHER PUBLICATIONS

International Search Report issued Aug. 26, 2008 in International (PCT) Application No. PCT/JP2008/059549.

Extended European Search Report (in English language) issued Dec. 6, 2011 in corresponding European Patent Application No. 08 76 4595.

* cited by examiner

METHOD FOR PRODUCING ELECTRIC-WAVE-TRANSMISSIBLE TRANSFERRING MEMBER

BACKGROUND OF THE INVENTION

1. Technical Field

The present invention relates to a method for producing an electric-wave-transmissible transferring member capable of expressing a beautiful metallic luster pattern having a sharp outline.

2. Description of the Related Art

About communication instruments such as a cellular phone, information-processing instruments inside a car, and household electric appliances, there is a method using a transferring member to decorate a surface of a plastic molded product in order to express an electric-wave-transmissible metallic luster onto the surface.

Of the known methods for decorating a surface of a product to be transferred, a transfer method is known. The transfer method is a method of using a transferring member in which a transfer layer composed of a peel layer, a drawing pattern layer, an adhesive layer, and others is formed on a base sheet, heating and pressing the member to cause the transfer layer to adhere closely onto a product to be transferred, and thereafter peeling the base sheet to transfer only the transfer layer onto the product, thereby making decorative surface.

In a case where the product to be transferred is a resin molded product, in-mold decoration exists as a method of performing the transfer method more reasonably. The in-mold decoration is a method of sandwiching a transferring member between molding dies so as to be put in the dies, injecting a resin into the molding dies so as to be filled thereinto and cooling the resultant to obtain a resin molded product at the same time when the transferring member is bonded onto a surface of the molded product, and subsequently peeling the base sheet to transfer the transfer layer onto the surface of the, thereby making decorative surface.

As a method for producing an electric-wave-transmissible transferring member with metallic luster, which is used in such a method, for example, a method disclosed in Japanese Examined Patent No. 7-37111 is known. In this method, a water-soluble paint is painted onto a part of a surface of a substrate by printing or the like, and then an insulating metallic thin film is formed onto the entire surface thereof. Furthermore, a water-insoluble paint is painted into a thickness of 0.05 to 1.0 μm onto the insulating metallic thin film. Thereafter, the thus-obtained workpiece is washed with water to dissolve and remove the water-soluble paint. According to this method, the insulating metallic thin film and the water-insoluble paint on the water-soluble paint are removed while the insulating metallic thin film and the water-insoluble paint in the region where the water-soluble paint is not present are caused to remain, thereby partially transferring the insulating metallic thin film.

SUMMARY OF THE INVENTION

1. Issues to be Solved by the Invention

However, the above-mentioned transferring-member-producing method has an issue that the outline of the metallic luster pattern becomes obscure without becoming sharp. In other words, the method has the following issue: insufficient adhesiveness between the individual layers constituting the resultant transferring member, in particular, between, the water-soluble paint and the insulating metallic thin film and the water-insoluble paint. Thus, when the water-soluble paint is removed in the water-washing step, the insulating metallic thin film and the water-insoluble paint are not removed just along the outline of the pattern formed by the water-soluble paint. As a result, the outline of the metallic luster pattern expressed by the insulating metallic thin film cannot be made as sharp a pattern as intended (see FIG. 3).

Accordingly, an object of the present invention is to overcome issues as described above and provide a method for producing an electric-wave-transmissible transferring member capable of expressing a metallic luster pattern having a sharp outline.

2. Means for Solving the Issues

In order to attain the object, the electric-wave-transmissible transferring member of the present invention is constructed as follows.

Thus, the method for producing an electric-wave-transmissible transferring member of a first aspect of the present invention is constructed by:

forming a peel layer over a base sheet having peelability and throughout a whole of a surface of the sheet;

forming a water-soluble pattern layer over the peel layer and in a partial region of the peel layer;

forming an electric-wave-transmissible metallic luster layer over the peel layer and the water-soluble pattern layer and throughout a whole of the peel layer and the water-soluble pattern layer;

forming a protective layer over the electric-wave-transmissible metallic luster layer and throughout a whole of a surface of the luster layer, or forming, partially, a protective layer over the electric-wave-transmissible metallic luster layer and in a region where the water-soluble pattern layer is not formed;

subjecting a workpiece to a heating treatment for heightening adhesiveness between the water-soluble pattern layer, the electric-wave-transmissible metallic luster layer, and the protective layer;

subjecting the workpiece to a water-washing treatment, thereby peeling and removing the water-soluble pattern layer, and the electric-wave-transmissible metallic luster layer and the protective layer formed over the water-soluble pattern layer, and forming an adhesive layer wholly or partially over the workpiece.

A second aspect of the present invention is the method of the first aspect, for producing an electric-wave-transmissible transferring member, wherein the water-soluble pattern layer may be a layer comprising an acrylic acid ester copolymer.

A third aspect of the present invention is the method of the first aspect, for producing an electric-wave-transmissible transferring member, wherein the protective layer may be a layer comprising a thermoplastic polyester resin or a thermoplastic polyurethane resin.

A fourth aspect of the present invention is the method of the first aspect, for producing an electric-wave-transmissible transferring member, wherein the heating treatment may be a treatment for performing heating at a temperature of 120 to 170° C. for 20 to 50 seconds.

3. Effects of the Invention

The method for producing an electric-wave-transmissible transferring member of the present invention, includes: forming the peel layer over the base sheet having the peelability and throughout the whole of a surface of the sheet, then forming the water-soluble pattern layer over the peel layer and in the partial region of the peel layer, then forming the electric-wave-transmissible metallic luster layer over the layers and throughout the whole of the layers, forming the protective layer over the electric-wave-transmissible metallic luster layer and throughout the whole of the surface of the luster layer or forming, partially, the protective layer over the electric-wave-transmissible metallic luster layer and in the region where the water-soluble pattern layer is not formed, then subjecting the workpiece to the heating treatment for heightening the adhesiveness between the water-soluble pattern layer, the electric-wave-transmissible metallic luster layer, and the protective layer, then subjecting the workpiece to the water-washing treatment, thereby peeling and removing the water-soluble pattern layer, and the electric-wave-transmissible metallic luster layer and the protective layer formed over the water-soluble pattern layer, and then forming an adhesive layer wholly or partially over the surface; it is therefore possible to obtain easily an electric-wave-transmissible transferring member capable of expressing a metallic luster pattern having a sharp outline.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
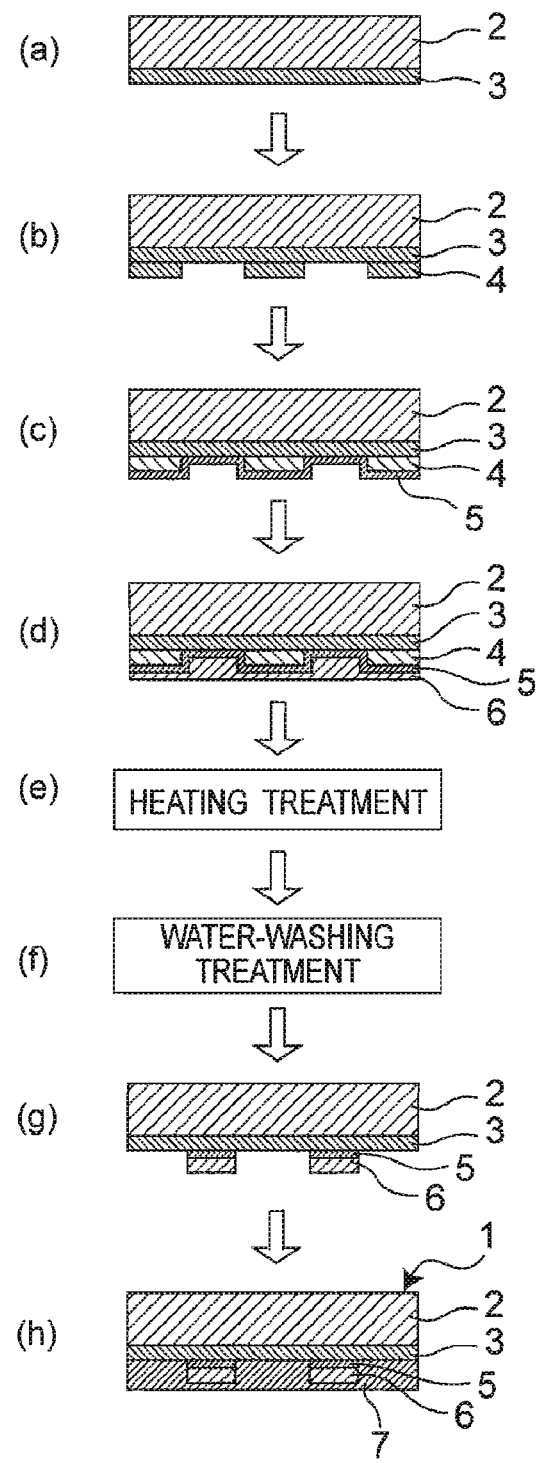
FIG. 1 is a sectional view illustrating the method for producing an electric-wave-transmissible transferring member of the present invention.

Before the description of the present invention proceeds, it is to be noted that like parts are designated by like reference numerals throughout the accompanying drawings. With reference to the drawings, a first embodiment of the present invention will be described in detail hereinafter.

Figure 2:
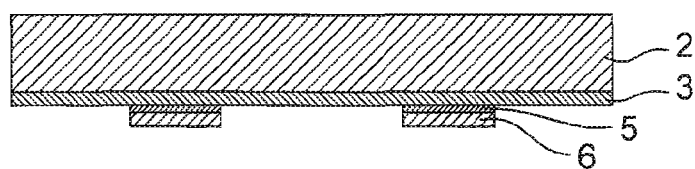
FIG. 2 is a sectional view illustrating a step in the method for producing the electric-wave-transmissible transferring member of the present invention.

FIG. 1 is a sectional view illustrating the method for producing an electric-wave-transmissible transferring member of the present invention. FIG. 2 is a sectional view illustrating a step in the method of the present invention for producing the electric-wave-transmissible transferring member. In the figures, reference numeral 1 represents an electric-wave-transmissible transferring member; 2, a base sheet; 3, a peel layer; 4, a water-soluble pattern layer; 5, an electric-wave-transmissible metallic luster layer; 6, a protective layer; and 7, an adhesive layer. In each of the figures, the same reference numbers are attached to the same constituting parts, respectively.

In the method for producing the electric-wave-transmissible transferring member 1 according to the first embodiment of the present invention, the peel layer 3 is formed on the base sheet 2, which has peelability, and throughout the whole of a surface of the sheet 2. Next, the water-soluble pattern layer 4 is formed on the peel layer 3 and in a partial region of the peel layer 3. Next, the electric-wave-transmissible metallic luster layer 5 is formed over the peel layer 3 and the water-soluble pattern layer 4 and throughout the whole of the surfaces thereof. Next, the protective layer 6 is formed on the electric-wave-transmissible metallic luster layer 5 and throughout the whole of the surface of the layer 5, or is formed thereon and, partially, in the region where the water-soluble pattern layer 4 is not formed. Next, the resultant workpiece is subjected to a heating, treatment, for heightening the adhesiveness between the water-soluble pattern layer 4, the electric-wave-transmissible metallic luster layer 5, and the protective layer 6. Next, the workpiece is subjected to a water-washing treatment, thereby peeling and removing the water-soluble pattern layer 4, and the electric-wave-transmissible metallic luster layer 5 and the protective layer 6 formed over the water-soluble pattern layer 4. Next, the adhesive layer 7 is wholly or partially formed over the surface (see FIG. 1).

The base sheet 2, which has the peelability, may be a base sheet that is used as a base sheet of an ordinary transferring member, and which is a resin sheet made of a polypropylene resin, a polyethylene resin, a polyamide resin, a polyester resin, an acrylic resin, a polyvinyl chloride resin, or the like. When a surface of the base sheet 2 has minute irregularities, the irregularities are reflected onto the transfer layer so that delustering, or a surface form such as a hairline can be expressed.

In order to improve the peelability of the transfer layer from the base sheet 2, a release layer (not illustrated) may be formed on the base sheet 2 and throughout the whole of a surface thereof before the transfer layer is formed on the base sheet 2. The release layer is released together with the base sheet 2 from the transfer layer at the time of peeling the base sheet 2 after transferring or in-mold decoration. The material of the release layer may be a melamine resin release agent, a silicone resin release agent, a fluorine resin release agent, a cellulose derivative release agent, a urea resin release agent, a polyolefin resin release agent, or a paraffin release agent; a composite-type release agent of these agents; or the like. The method for forming the release layer may be a coating method such as roll coating or spray coating, or a printing method such as gravure printing or screen printing.

The peel layer 3 is formed on a surface of the base sheet 2 and throughout the whole of the surface (see FIG. 1(a)). The peel layer 3 is a layer that is peeled from the base sheet 2 or the release layer at the time of peeling the base sheet 2 after transferring or in-mold decoration, so as to become an outermost layer of the product to be transferred. The material of the peel layer 3 may be an acrylic resin, a polyester resin, a polyvinyl chloride resin, a cellulose resin, a rubbery resin, a polyurethane resin, a polyvinyl acetate resin, or the like, or may be a copolymer such as a vinyl chloride/vinyl acetate copolymer resin or an ethylene/vinyl acetate copolymer resin. When the peel layer 3 is required to have hardness, the peel layer 3 may be selected from photocurable resins such as an ultraviolet curable resin, radiation curable resins such as an electron beam curable resin, thermosetting resins, and others. The peel layer 3 may or may not be colored. The method for forming the peel layer 3 may be a coating method such as gravure coating, roll coating, or comma coating; or a printing method such as gravure printing or screen printing.

Next, the water-soluble pattern layer 4 is formed on the peel layer 3 and in a partial region of the peel layer 3 (see FIG. 1(b)). The electric-wave-transmissible metallic luster layer 5 is formed throughout the whole of the surface of the partially-formed water-soluble pattern layer 4 so as to be put onto the partially-formed water-soluble pattern layer 4. The water-soluble pattern layer 4 is subjected to a water-washing treatment, so as to be removed, whereby an electric-wave-transmissible pattern having metallic luster is formed in the region where the water-soluble pattern layer 4 is not formed. The water-soluble pattern layer 4 can be formed, for example, by a printing method, such as gravure printing, flexographic printing, or screen printing, using an ink containing, as a binder, a water-soluble resin, typical examples of which include polyvinyl alcohol, starch, alkyd, epoxy, polyurethane, or an acrylic acid ester copolymer.

Next, the electric-wave-transmissible metallic luster layer 5 is formed over the peel layer and the water-soluble pattern layer and throughout the whole of the surfaces (see FIG. 1(c)). The electric-wave-transmissible metallic luster layer 5 is a layer for expressing metallic luster, and is formed by vacuum evaporation, sputtering, ion plating, or the like. Depending on a metallic luster color desired to be expressed, the following is used: a metal such as tin, nickel, gold, platinum, chromium, iron, copper, indium, silver, titanium, lead, or zinc; or an alloy or a compound thereof. In particular, tin and other metals can each be formed so as to have electric-wave-transmissibility by forming the metal into a thin film having a minute-island-form structure.

When the electric-wave-transmissible metallic luster layer 5 is formed, an anchor layer may be formed (not illustrated) in order to improve the adhesiveness between the other component(s) of the transfer layer and the electric-wave-transmissible metallic luster layer 5. The material of the anchor layer may be a two-component curable urethane resin, a thermosetting urethane resin, a melamine resin, a cellulose ester resin, a chlorine-containing rubbery resin, a chlorine-containing vinyl resin, an acrylic resin, an epoxy resin, a vinyl copolymer resin, or the like. The method for forming a pre-anchor layer and a post-anchor layer may be a coating method such as gravure coating, roll coating; or comma coating; or a printing method such as gravure printing or screen printing.

Next, the protective layer 6 is formed on the whole of the surface of the workpiece or is formed thereon and, partially, in the region where the water-soluble pattern layer 4 is not formed (see FIG. 1(d)). For the protective layer 6, a thermoplastic resin is preferably used. It is advisable to use a polyester resin, a polyurethane resin, an acrylic resin, a polyvinyl chloride resin, a cellulose resin, a rubbery resin, a polyvinyl acetate resin, or the like, or use a copolymer such as a vinyl chloride/vinyl acetate copolymer resin or an ethylene/vinyl acetate copolymer resin.

Next, the workpiece is subjected to a heating treatment to heighten the adhesiveness between the water-soluble pattern layer, the electric-wave-transmissible metallic luster layer, and the protective layer (see FIG. 1(e)). In a case where the anchor layer or some other layer is formed between the individual layers, the treatment is conducted to heighten adhesiveness between two layers out of the layers adjacent to each of the water-soluble pattern layer, the electric-wave-transmissible metallic luster layer, and the protective layer.

It is advisable to use, as the heating treatment, a treatment using infrared rays or hot wind as a heat source, or some other treatment. The treatment may be in either of a roll support manner and a floating manner. About conditions for the heating, it is preferred that the peak temperature of the film surface and the heating time are set into the range of 120 to 170° C., and the range of 20 to 50 seconds, respectively. It is particularly preferred that the peak temperature of the film surface and the heating time are set in the range of 140 to 150° C., and the range of 30 to 40 seconds, respectively. If the conditions are out of the ranges so that the calorie based on the heating treatment is small, the electric-wave-transmissible metallic luster layer 5 and the protective layer 6 together with the water-soluble pattern layer 4 are not completely removed at the time of the water-washing treatment, which is in a subsequent step, so that an outline of a sharp pattern may not be obtained. If the conditions are over the ranges so that the calorie based on the heating treatment is large, the base sheet 2 may suffer damage that will adversely affect for example dimension precision thereof. The heating treatment referred to in the present invention is a treatment that is different from a printing-ink-drying treatment adopted in ordinary printing, and means a treatment conducted at a higher temperature for a longer time as compared with the drying treatment. For example, in a drying treatment in gravure printing, usually, heating at 80 to 100° C. is merely conducted for several seconds.

Figure 3:
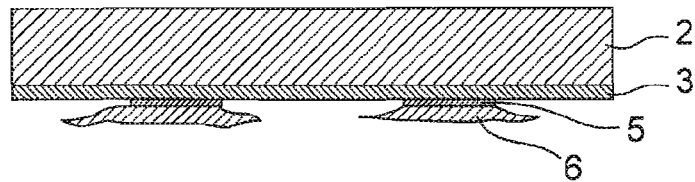
FIG. 3 is a sectional view illustrating a step in the method for producing an electric-wave-transmissible transferring member in a conventional technique.

In the present invention, heating treatment is conducted at a high temperature for a long time after the formation of the protective layer 6, thereby improving the adhesiveness between the water-soluble pattern layer 4, the electric-wave-transmissible metallic luster layer 5, and the protective layer 6. Thus, when the water-soluble pattern layer 4 is removed by a water-washing treatment, which is performed in a subsequent step, the water-soluble pattern layer 4, the electric-wave-transmissible metallic luster layer 5, and the protective layer 6 are cleanly removed along the outline of the shape which the water-soluble pattern layer 4 forms. In the region where the water-soluble pattern layer 4 is not formed, the electric-wave-transmissible metallic luster layer 5 and the protective layer 6 remain completely along the outline of the shape which the water-soluble pattern layer 4 forms (see FIG. 2). If the heating treatment is not conducted, the adhesiveness between the water-soluble pattern layer 4, the electric-wave-transmissible metallic luster layer 5, and the protective layer cannot be maintained. Thus, when the water-soluble pattern layer 4 is removed by a water-washing treatment, the electric-wave-transmissible metallic luster layer 5 and the protective layer 6, which are to be essentially removed together with the water-soluble pattern layer 4, partially remain. As a result, the workpiece is not patterned along the outline which the water-soluble pattern layer 4 forms, so that a sharp outline is not easily obtained (see FIG. 3).

Next, the workpiece is subjected to a water-washing treatment (see FIG. 1(f)), so as to peel and remove the water-soluble pattern layer 4, and the electric-wave-transmissible metallic luster layer 5 and the protective layer 6 formed over the layer 4 (see FIG. 1(g)). In order to conduct the water-washing treatment, it is advisable that while the sheet, wherein the water-soluble pattern layer 4 is formed, is immersed into a cool or hot water tank or while cool or hot water is showered thereon, the surface where the protective layer 6 is formed is rubbed and cleaned with a soft brush, so that the water-soluble pattern layer 4, together with the electric-wave-transmissible metallic luster layer 5 and the protective layer 6 formed on the water-soluble pattern layer 4, is completely removed. In the water-washing treatment, the electric-wave-transmissible metallic luster layer 5 is physically protected by the protective layer 6; thus, even when the water-washing brush or the transporting roll contacts the sheet, the electric-wave-transmissible metallic luster layer 5 is not easily injured. Next, water adhering onto the sheet is dried by drying with hot wind, so as to be removed. Since the adhesiveness between the water-soluble pattern layer 4, the electric-wave-transmissible metallic luster layer 5 and the protective layer 6 is made high by the previously-conducted heating treatment, the removal of the water-soluble pattern layer 4 by the water-washing treatment causes the electric-wave-transmissible metallic luster layer 5 and the protective layer 6 to remain with a sharp outline along the outline which the water-soluble pattern layer 4 forms.

Next, the adhesive layer 7 is wholly or partially formed on the surface (see FIG. 1(h)) to obtain the electric-wave-transmissible transferring member 1. The adhesive layer 7 is a layer for bonding the above-mentioned individual layers onto a surface of a product to be transferred. The adhesive layer 7 is formed in the region desired to be bonded. Specifically, when the region desired to be bonded is the whole of the surface, the adhesive layer 7 is formed on the whole of the surface. When the region desired to be bonded is a part thereof, the adhesive layer 7 is, partially formed. For the adhesive layer 7, a thermosensitive or pressure-sensitive resin suitable for the material of the product to be transferred is appropriately used. In a case where the material forming the product is, for example, an acrylic resin, it is advisable to use an acrylic resin. In a case where the material of the product is a polyphenylene oxide/polystyrene resin, a polycarbonate resin, a styrene copolymer resin, or a polystyrene blend resin, it is advisable to use a resin affinitive with the resin, such as an acrylic resin, a polystyrene resin, or a polyamide resin. In a case where the material of the product to be transferred is a polypropylene resin, it is allowable to use a chlorinated polyolefin resin, a chlorinated ethylene/vinyl acetate copolymer resin, a cyclized rubber, or a coumarone-indene resin. The method for forming the adhesive layer 7 may be a coating method such as gravure coating, roll coating, or comma coating, or a printing method such as gravure printing or screen printing.

The structure of the transfer layer is not limited to the above-mentioned modes. A design pattern layer may be formed to provide a decoration made of various patterns, characters, or the like (not illustrated) besides a metallic luster pattern based on the electric-wave-transmissible metallic luster layer 5. It is advisable to use, as the material of the design pattern layer, a colored ink containing a resin, such as a polyvinyl resin, a polyamide resin, a polyester resin, an acrylic resin, polyurethane resin, a polyvinyl acetal resin, a polyesterurethane resin, a cellulose ester resin, or an alkyd resin, as a binder and containing a pigment or a dye in an appropriate color as a colorant. The method for forming the printed layer may be an ordinary printing method such as gravure printing, screen printing, or offset printing. In order to make multicolor printing or gray-scale expression, offset printing or gravure printing is particularly suitable. In a case where the design pattern layer is in a single color, a coating method such as gravure coating, roll coating, or comma coating may be adopted. It is advisable to form the design pattern layer into an arbitrary pattern depending on a pattern desired to be expressed.

When the electric-wave-transmissible transferring member 1, which is constructed as described above, is used as described below, a product to receive the transfer member can be decorated.

The product may be a resin molded product, or any one of products made of various materials. The product may be transparent, semitransparent, or opaque. The product may or may not be colored. The resin may be a general-purpose resin, such as a polystyrene resin, a polyolefin resin, an ABS resin, an AS resin, or an AN resin. Moreover, the resin may be a general-purpose engineering resin, such as a polyphenylene oxide/polystyrene resin, a polycarbonate resin, a polyacetal resin, an acrylic resin, a polycarbonate modified polyphenylene ether resin, a polybutylene terephthalate resin, or a superhigh molecular weight polyethylene resin; or a super engineering resin such as a polysulfone resin, a polyphenylene sulfide resin, a polyphenylene oxide resin, a polyarylate resin, a polyetherimide resin, a polyimide resin, a liquid crystal polyester resin, or a polyallyl heat-resistant resin. Furthermore, the resin may be a composite resin, to which a reinforcing material such as a glass fiber or an inorganic filler is added.

The following describes a method of making use of the electric-wave-transmissible transferring member 1 having the above-mentioned layer structure to provide decoration onto a surface of a product, using a transfer method. First, the adhesive layer 7 side of the electric-wave-transmissible transferring member 1 is caused to adhere closely onto the surface of the product to receive the transfer. Next, a transferring machine, such as a roll transferring machine or an up-down transferring machine, provided with a heat-resistant rubbery elastomer such as a silicon rubber is used to apply heat and pressure to the electric-wave-transmissible transferring member 1 from the base sheet 2 side of the electric-wave-transmissible transferring member 1 in the state that the heat-resistant rubbery elastomer set into conditions that the temperature is from about 80 to 260° C. and the pressure is from about 490 to 1960 Pa is interposed therebetween. In this way, the adhesive layer 7 is bonded to the transfer surface of the product. Lastly, the workpiece is cooled and then the base sheet 2 is peeled, so that peeling is caused in the interface between the base sheet 2 and the peel layer 3, so as to complete the transfer.

The following describes a method of using the above-described electric-wave-transmissible transferring member 1 to decorate a surface of a resin molded product which is a product to be transferred, using in-mold decoration based on injection molding. First, the electric-wave-transmissible transferring member 1 is fed into a molding die composed of a mobile mold and a fixed mold. At this time, plural sheets, each of which constitute the electric-wave-transmissible transferring member 1, may be fed one-by-one. Alternatively, necessary portions of the electric-wave-transmissible transferring member 1 in a long form may be intermittently fed. In a case where the long-form electric-wave-transmissible transferring member 1 is used, it is advisable to use a feeding device having a positioning mechanism to make a positioning mark of the pattern of the electric-wave-transmissible transferring member 1 consistent with a positioning mark of the molding die. When the electric-wave-transmissible transferring member 1 is intermittently fed, it is allowable to detect the position of the electric-wave-transmissible transferring member 1 with a sensor(s) and subsequently fix the electric-wave-transmissible transferring member 1 by means of the mobile and fixed molds. In this case, the electric-wave-transmissible transferring member 1 can be fixed at the same position at any time. Thus, conveniently, the pattern is not arranged out of position. The molding die is closed, and then a melted resin is injected and filled from the gate thereof into the die. In this way, a product to receive the transfer is formed, and simultaneously the electric-wave-transmissible transferring member 1 is bonded onto a surface thereof. The resin molded product, which is the product to receive the transfer, is cooled, and then the molding die is opened to take out the resin molded product. Lastly, the base sheet 2 is peeled to complete the transfer.

WORKING EXAMPLES

A PET film, 38 μm in thickness, having a release layer was used as a base sheet. First, a photocurable resin was formed as a peel layer, into 5 μm in thickness, onto the sheet and throughout the whole of a surface thereof by coater printing. Next, a water-soluble resin made of an acrylic acid ester copolymer was formed as a water-soluble pattern layer, 1 μm in thickness, thereon by gravure printing.

Next, a resistance heating type vacuum evaporating device was used to form an electric-wave-transmissible metallic luster layer, into 200 Å in thickness, onto the whole of the surface.

Next, a one-component polyester resin was used to form a protective layer into a thickness of 0.5 μm (film thickness when the layer was dried) partially on the luster layer by gravure printing.

Next, a hot wind heat treatment machine was used to subject the film to a heating treatment at 140° C. for 30 seconds.

Next, the film was passed through a water-washing machine at a running speed of 10 m/minute to peel and remove the water-soluble pattern layer, and the electric-wave-transmissible metal-evaporated layer and the protective layer formed over the pattern layer (water-washing treatment).

Next, a vinyl chloride resin was used to form an adhesive layer into a thickness of 1 μm (film thickness when the layer was dried) on the whole of the surface by gravure printing. In this way, an electric-wave-transmissible transferring member was obtained.

The thus-obtained electric-wave-transmissible transferring member was a member having a metallic luster pattern having a sharp outline, wherein the electric-wave-transmissible metallic luster layer and the protective layer had been removed just along the outline of the pattern which the water-soluble pattern layer had formed.

An electric-wave-transmissible transferring member was obtained as a comparative example in the same way as in the above-mentioned working example except that only in the following point, the above-mentioned method was changed: no heating treatment was conducted. As a result, the electric-wave-transmissible metallic luster layer and the protective layer were not removed just along the outline of the pattern which the water-soluble pattern layer formed, so that the outline of the metallic luster pattern was not sharp but obscure.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The present invention can be used suitably for decoration of various molded products, such as communication instruments such as a cellular phone, information-processing instruments inside a car, and household electric appliances, and for other purposes; thus, the present invention is industrially useful.

The invention claimed is:

1. A method for producing an electric-wave-transmissible transferring member, the method comprising:
    forming a peel layer over a whole surface of a base sheet that has peelability;
    forming a water-soluble pattern layer over the peel layer and in a partial region of the peel layer;
    forming an electric-wave-transmissible metallic luster layer over the peel layer and the water-soluble pattern layer and throughout a whole of the peel layer and the water-soluble pattern layer;
    forming a protective layer over the electric-wave-transmissible metallic luster layer and throughout a whole of a surface of the luster layer, or forming, partially, a protective layer over the electric-wave-transmissible metallic luster layer and in a region where the water-soluble pattern layer is not formed, thereby forming a workpiece;
    subjecting the workpiece to a heating treatment for heightening adhesiveness between the water-soluble pattern layer, the electric-wave-transmissible metallic luster layer, and the protective layer;
    after the heating treatment, subjecting the workpiece to a water-washing treatment, thereby peeling and removing (1) the water-soluble pattern layer, and (2) the electric-wave-transmissible metallic luster layer and the protective layer formed over the water-soluble pattern layer, and
    forming an adhesive layer wholly or partially over the peel layer, the electric-wave-transmissible metallic luster layer, and the protective layer.

2. The method for producing an electric-wave-transmissible transferring member according to claim 1, wherein the water-soluble pattern layer is a layer comprising an acrylic acid ester copolymer.

3. The method for producing an electric-wave-transmissible transferring member according to claim 1, wherein the protective layer is a layer comprising a thermoplastic polyester resin or a thermoplastic polyurethane resin.

4. The method for producing an electric-wave-transmissible transferring member according to claim 1, wherein the heating treatment is a treatment for performing heating at a temperature of 120 to 170° C. for 20 to 50 seconds.

* * * * *